June 23, 1964   E. R. SIKORSKI   3,138,694
SPOT WELDING FIXTURE
Filed July 6, 1962
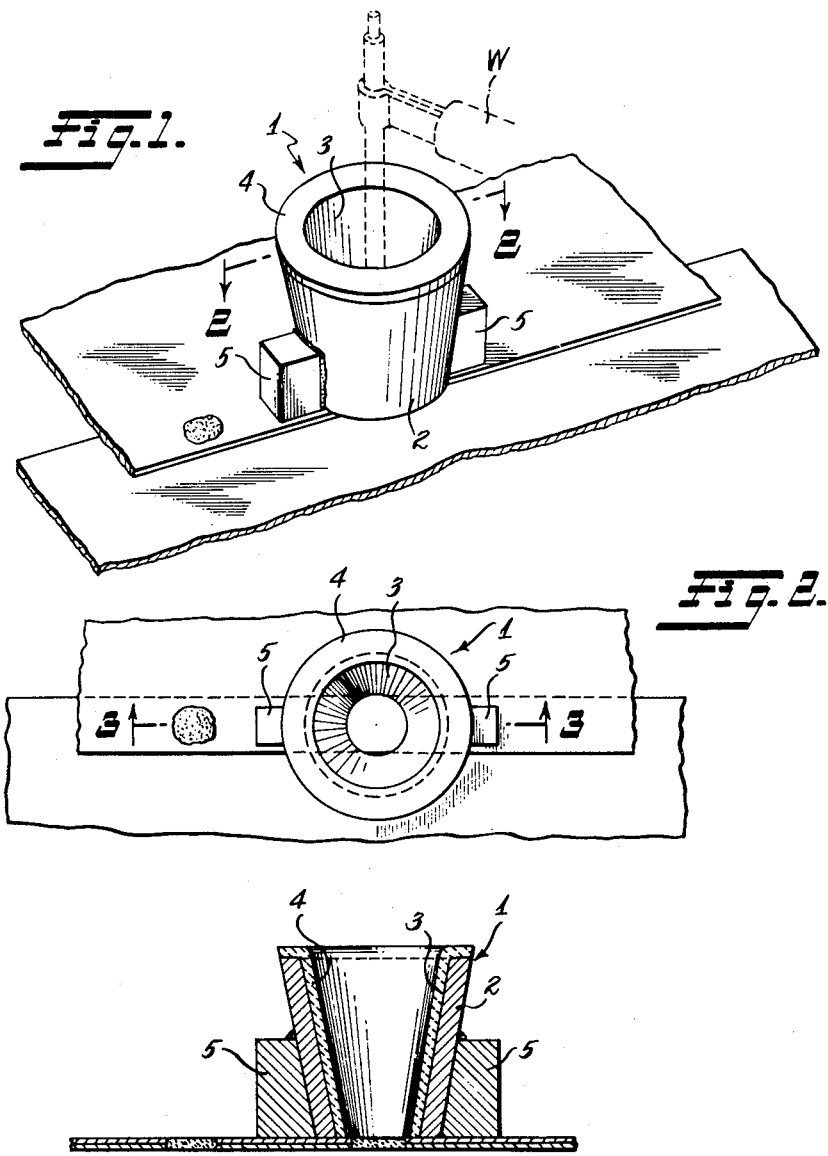
INVENTOR
Edward Richard Sikorski
BY Bacon & Thomas
ATTORNEYS

3,138,694
SPOT WELDING FIXTURE
Edward Richard Sikorski, Baker, Mont.
Filed July 6, 1962, Ser. No. 208,023
2 Claims. (Cl. 219—127)

This invention relates generally to spot welding, and more particularly to a novel device for guiding the welder, concentrating the heat at the point of the weld, and dissipating such heat as may be conducted to other areas of the work piece.

In using an electric spot welder, difficulties arise in concentrating the required amount of heat in the zone overlapping metal surfaces where fusion is desired. It is also difficult to dissipate the heat from the area immediately surrounding the desired zone of fusion to prevent warpage of the workpiece. These problems are particularly acute in spot welding light gauge sheet metals.

It is therefore a primary purpose of the invention to provide a simple, inexpensive device for use by welders to concentrate the heat generated by the welding gun and to control warpage of the workpiece by dissipating heat conducted to areas outside the zone of fusion.

Another object is to provide guide means for the welding gun and for preventing accidental displacement of the welding electrode during the welding operation.

Another object is to provide a device of the type referred to above which can be removably secured in position on the workpiece and is held securely thereon during the welding operation.

A further object is to provide a guide device of the type indicated which is compact and durable in construction and which can be employed with various types and sizes of welding guns, the guide having no attachment to the welding gun itself.

These and other objects will be more fully apparent from the following specification, when taken in conjunction with the accompanying drawings, in which:

FIG. 1 is a perspective view of a guide device illustrating the principles of the present invention.

FIG. 2 is a plan view of the device illustrated in FIG. 1, and

FIG. 3 is a cross section taken on the line 3—3 of FIG. 2.

Referring now more specifically to the drawings, one embodiment of the present invention is indicated generally by the numeral 1. The device 1 includes a generally frusto-conical ring 2 formed of bronze or other material which is highly heat conductive. The ring 2 is approximately 1½ inches in height, and 1½ inches in diameter at its upper end. The bore 3 of the ring tapers inwardly to a diameter of approximately ½ inch at its lower end. A liner 4 is disposed in the bore 3, covering the entire inner peripheral surface of the ring and lapping over at the upper end to cover the top of the ring. The liner 4 is tightly bonded to the ring 2 by any suitable means and serves as an insulator to prevent the electrodes of the welding gun from contacting the ring.

Two or more permanent magnets 5 are mounted on the outer periphery of ring 2 by any suitable means, the lower ends of the magnets terminating in substantially co-planar relationship with respect to the bottom of the ring 2. The magnets 5 should be strong enough to hold the device 1 securely in position on the workpiece once it has been properly located at the desired point of welding.

In employing the present device a welder may first determine the desired points of welding, as at spaced points along the lapped joint illustrated in the drawings, and these points may be marked if desired. The device of the present invention can then be accurately centered successively on the various points where welding is to occur, at which time a welding gun as illustrated at W in FIG. 1 is brought into position. The tip of the welding gun is guided on the tapered surface of the bore 3, and short-circuiting through the ring 2 is prevented by the liner 4. Heat generated at the point of weld is dissipated through the ring 2 to prevent warpage of the workpiece in the area surrounding the weld.

It will be understood that the foregoing description has been given by way of example only. Numerous changes and modifications may be made in the construction, dimensions and arrangement of parts without departing from the spirit of the invention or the scope of the annexed claims.

I claim:

1. A device for use in spot welding, comprising: an annular bronze ring having a ceramic lining securely bonded over the entire inner surface thereof and covering the upper surface thereof, said ring being generally frusto-conical in configuration to define a central bore which has a lower end substantially equal in size to the spot to be welded, said bore tapering upwardly and outwardly therefrom to define a guide for the welding gun, and a pair of magnets secured to opposite sides of said ring along the outer periphery thereof, said magnets terminating at their lower ends in substantially co-planar relationship with respect to the bottom of said ring for contacting engagement with the workpiece when said device is mounted at the desired point of weld to hold said ring against dislodgment.

2. A device for use in spot welding, comprising: an annular ring capable of high heat absorption; an electrically insulative liner covering the inner periphery of said ring and extending outwardly to cover the upper end of said ring; and a means for mounting said ring on a work piece at the desired point of welding and for holding said ring against dislodgment.

References Cited in the file of this patent
UNITED STATES PATENTS

| | | |
|---|---|---|
| 1,582,081 | Peck | Apr. 27, 1926 |
| 1,902,051 | Wall | Mar. 21, 1933 |
| 2,002,877 | Barrington | May 28, 1935 |
| 2,123,612 | Obert | July 12, 1938 |
| 2,219,352 | Andrus | Oct. 29, 1940 |
| 2,293,163 | Morris | Aug. 18, 1942 |
| 2,459,957 | Palmer | Jan. 25, 1949 |
| 2,584,072 | White | Jan. 29, 1952 |
| 2,727,971 | Mowry | Dec. 20, 1955 |
| 2,817,001 | Woodling | Dec. 17, 1957 |
| 2,922,023 | Hackman et al. | Jan. 19, 1960 |
| 2,922,542 | Barr | Jan. 26, 1960 |
| 2,922,870 | Collins et al. | Jan. 26, 1960 |